(12) United States Patent
Thornqvist

(10) Patent No.: US 10,058,943 B2
(45) Date of Patent: Aug. 28, 2018

(54) CUTTING INSERT AND GEAR MILLING CUTTER

(71) Applicant: SANDVIK INTELLECTUAL PROPERTY AB, Sandviken (SE)

(72) Inventor: Johan Thornqvist, Uppsala (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 211 days.

(21) Appl. No.: 14/841,225

(22) Filed: Aug. 31, 2015

(65) Prior Publication Data

US 2016/0059333 A1 Mar. 3, 2016

(30) Foreign Application Priority Data

Sep. 1, 2014 (EP) .................................... 14183034

(51) Int. Cl.
| | | |
|---|---|---|
| *B23C 5/08* | (2006.01) | |
| *B23C 5/20* | (2006.01) | |
| *B23C 5/22* | (2006.01) | |
| *B23F 21/14* | (2006.01) | |

(52) U.S. Cl.
CPC .............. *B23F 21/146* (2013.01); *B23C 5/08* (2013.01); *B23C 5/2221* (2013.01); *B23C 5/2247* (2013.01); *B23C 2200/0494* (2013.01); *B23C 2200/128* (2013.01); *B23C 2200/165* (2013.01); *B23C 2200/203* (2013.01); *B23C 2200/367* (2013.01); *B23C 2210/244* (2013.01)

(58) Field of Classification Search
CPC ....... B23C 5/08; B23C 5/2221; B23C 5/2247; B23C 5/2234; B23C 2200/165; B23C 2210/244; B23F 21/146; B23F 21/143; B23F 21/166; B23F 21/163; B23F 21/128
See application file for complete search history.

(56) References Cited

U.S. PATENT DOCUMENTS

| | | | |
|---|---|---|---|
| 9,700,947 B2 * | 7/2017 | Dufour | ................. B23C 5/2221 |
| 2008/0138161 A1 | 6/2008 | Wermeister | |
| 2011/0236143 A1 | 9/2011 | Ryu | |
| 2011/0255925 A1 | 10/2011 | Yoshida | |

(Continued)

FOREIGN PATENT DOCUMENTS

| | | | | |
|---|---|---|---|---|
| DE | 102005029053 A1 * | 1/2007 | ............ | B23F 21/166 |
| EP | 2433735 A1 * | 3/2012 | ............ | B23F 21/146 |

(Continued)

*Primary Examiner* — Daniel Howell
*Assistant Examiner* — Ryan Rufo
(74) *Attorney, Agent, or Firm* — Corinne R. Gorski

(57) ABSTRACT

A cutting insert and a gear milling cutter is disclosed. A first major side portion of an insert body of the cutting insert is provided with a first recess having a first bottom surface (24a) and a second major side portion is provided with a second recess having a second bottom surface. The first and second bottom surfaces extend substantially in parallel with a longitudinal axis of the insert body. A first minor side portion is provided with a third recess having a third bottom surface and a second minor side portion is provided with a fourth recess having a fourth bottom surface, the third and fourth bottom surfaces extending across the longitudinal axis. Thus, the cutting insert may be supported in a relevant gear milling cutter against one of the first and second bottom surfaces and against one of the third or fourth bottom surfaces.

15 Claims, 7 Drawing Sheets

(56) References Cited

U.S. PATENT DOCUMENTS

2012/0301233 A1  11/2012  Gesell et al.
2013/0142578 A1* 6/2013  Shinjo .................... B23C 5/207
                                                  407/70

FOREIGN PATENT DOCUMENTS

JP        2014073545 A      4/2014
WO        2014104245 A1     7/2014
WO    WO 2014104245 A1 *    7/2014    ............... B23C 5/08

* cited by examiner

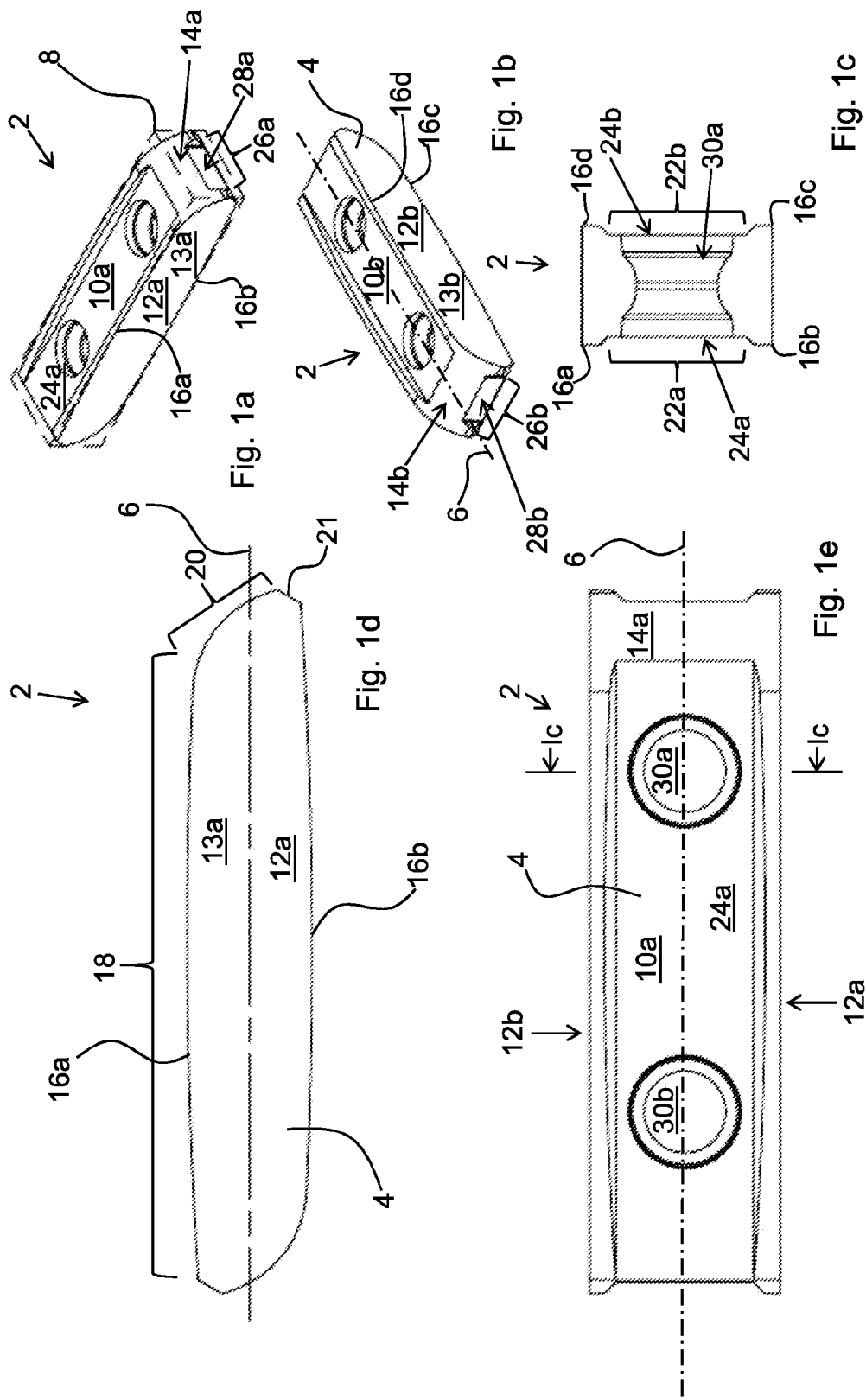

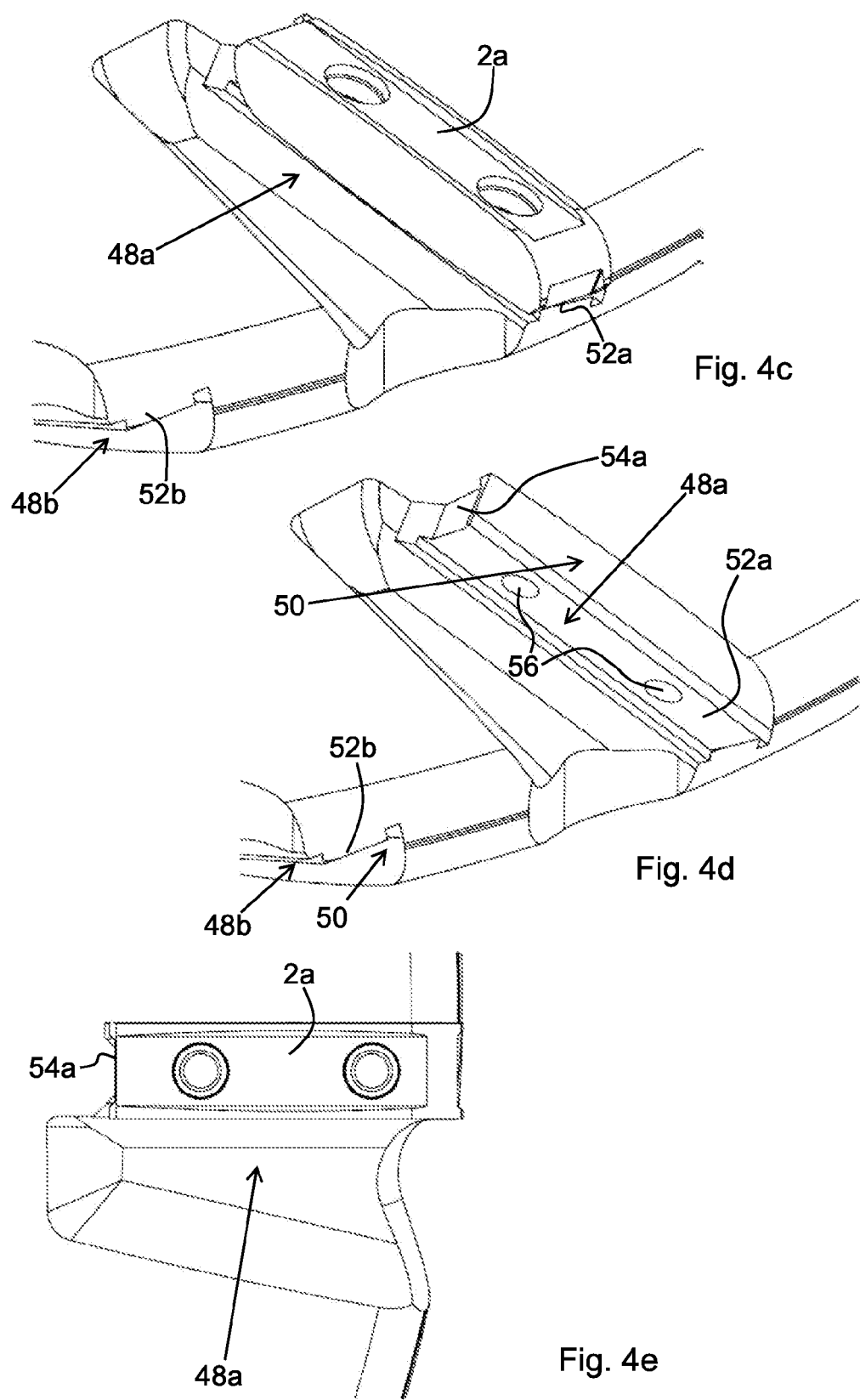

CUTTING INSERT AND GEAR MILLING CUTTER

RELATED APPLICATION DATA

This application claims priority under 35 U.S.C. § 119 to EP Patent Application No. 14183034.9, filed on Sep. 1, 2014, which the entirety thereof is incorporated herein by reference.

TECHNICAL FIELD

The present disclosure relates to a cutting insert and a gear milling cutter including a cutting insert.

BACKGROUND

Cutting tooth grooves of a gear or the like require specifically designed and shaped cutting tools to cut flanks of the teeth and to reach a bottom land between the teeth at the roots of the teeth.

US 2011/0255925 discloses a cutting insert for cutting tooth grooves. Several cutting inserts are removably mounted on insert seats formed in a peripheral portion of a disc shaped tool body of a cutting tool. The cutting insert includes a substantially planar insert body of a substantially square shape in a plan view. The insert body comprises two cutting edges, one each at a respective intersection ridge between each of two rake faces and an upper surface. Each cutting edge is a substantial involute in a side view of the body. Thus, involute teeth may be cut with the cutting tool and each cutting insert may be used twice, i.e. each of the two cutting edges may be used, a first cutting edge cutting a first flank of teeth when the cutting insert is positioned in an insert seat on a first side of the tool body, and a second cutting edge cutting an opposite second flank of teeth when the cutting insert is positioned in an insert seat on an opposite second side of the tool body.

In US 2012/0301233 a starting point is taken in a two-edge cutting insert to provide a side-milling cutter for machining toothing systems having an indexable cutting insert with four cutting edges that can be used in succession. The insert has a rectangular cross-section, two top surfaces facing away from each other, two long insert sides located opposite each other and also two narrow insert sides located opposite each other. Of four cutting edges of the insert, which extend along the long insert sides in the longitudinal direction, in each case two cutting edges delimit the top surfaces of the insert, each cutting edge extending in a curve. Each top surface is provided with a bearing area protruding from the top surface. By means of the bearing area, the indexable insert rests with its inactive side on the bottom of a holding pocket of the side-milling cutter. Also the narrow insert side is supported in the holding pocket. The bearing area and the narrow insert side thus, support the indexable insert relative to the holding pocket.

The curve of each cutting edge has to be adapted to the relevant tooth profile being cut with the cutting insert. Thus, in the cutting insert of US 2012/0301233 the shape and size of the bearing area is affected by a relevant curve shape of the cutting edges. For some cutting edge shapes the bearing area may be too small to provide a reliable positioning of the insert in a holding pocket during use of the side-milling cutter.

JP 2014-073545 discloses a cutting insert having a flat plate-like insert body of which the four sides can be used as cutting edges. The shape of each cutting edge forms an involute curved line. The insert body has a flat surface provided on a top face, and a flat surface provided on a lower face between two flanks on each of the top and lower faces. Each cutting edge extends along one of the flanks.

SUMMARY

According to the present disclosure, a cutting insert for a gear milling cutter having four cutting edges is precisely positionable in an insert seat of the gear milling cutter irrespective of a relevant shape of the cutting edge.

According to an aspect of the disclosure, the cutting insert for a gear milling cutter includes an insert body having a longitudinal axis extending along a longitudinal direction of the insert body. The insert body is generally shaped to fit inside an imaginary rectangular cuboid, and includes:
a first major side portion and a second major side portion extending in the longitudinal direction on opposite sides of the insert body,
a first rake face side portion and a second rake face side portion extending in the longitudinal direction on opposite sides of the insert body,
a first minor side portion and a second minor side portion extending across the longitudinal axis on opposite sides of the insert body, and
four curved cutting edges, each curved cutting edge extending along a rim portion formed at an intersection between the first or second rake face side portion and the first or second major side portion continuing into the first or second minor side portion. Each curved cutting edge comprises a tooth flank cutting portion and a tooth root cutting portion. The first major side portion is provided with a first recess having a first bottom surface and the second major side portion is provided with a second recess having a second bottom surface, the first and second bottom surfaces extending substantially in parallel with the longitudinal axis. The first minor side portion is provided with a third recess having a third bottom surface and the second minor side portion is provided with a fourth recess having a fourth bottom surface, the third and fourth bottom surfaces extending across the longitudinal axis.

Since the first major side portion is provided with the first recess having the first bottom surface and the second major side portion is provided with the second recess having the second bottom surface, and the first minor side portion is provided with the third recess having the third bottom surface and the second minor side portion is provided with the fourth recess having the fourth bottom surface, the cutting insert is able to be supported in a gear milling cutter in the first or second recess, and the third or fourth recess, respectively.

More specifically, when positioned in an insert seat of the gear milling cutter, the first bottom surface abuts against a dedicated protrusion and the third or fourth bottom surface abuts against a further dedicated protrusion. Alternatively, in the same manner the second bottom surface abuts against a dedicated protrusion and the third or fourth bottom surface abuts against a further dedicated protrusion. Thus, it is ensured that the cutting insert is securely positioned in the insert seat both at the major side portions and the minor side portions, irrespective of a shape of the four cutting edges. In particular, due to the third and fourth bottom surfaces in the third and fourth recesses, the cutting edges at the minor side portions may be sharply curved in a manner required to cut a root portion of a tooth while the third and fourth bottom surfaces in the third and fourth recess, respectively, ensure a secure positioning of the cutting insert in a gear milling cutter. That is, when a cutting edge portion at the first minor side portion extends from the gear milling cutter to engage with a workpiece, the fourth bottom surface at the second minor side portion abuts against a protrusion in the insert seat to position the cutting insert in a direction along the longitudinal axis of the insert body, and vice versa when the second minor side portion extends from the gear milling cutter, the third bottom surface abuts against the protrusion in the insert seat. As a result, the above mentioned object is achieved.

In the prior art cutting inserts such a precise positioning along the longitudinal axis of a cutting insert has not been achieved in a four edged cutting insert, but only in a two edged cutting insert, e.g. as disclosed in US 2001/0255925, the cutting insert disclosed therein having a short side designed as a dedicated contact face.

Moreover, the first, second, third, and fourth bottom surfaces may be manufactured with high precision. Thus, the cutting insert may be precisely positioned in the insert seat of a cutting tool.

The cutting insert is indexable and double-sided, i.e. the cutting insert may be positioned in four different positions in an insert seat of a gear milling cutter with one of the four cutting edges extending from the insert seat to engage with a workpiece. The cutting insert may be manufactured from a material comprising e.g. one or more of cemented carbide, ceramics, cubic boron nitride, polycrystalline diamond, and cermet. The cutting insert may be coated with surface coatings such as e.g. titanium nitride, titanium carbonitride, and/or aluminium oxide. The cutting insert is arranged to be held in a gear milling cutter for cutting tooth grooves of a gear or the like comprising a disc-shaped cutter body. The cutting insert is configured to be positioned in an insert seat on either side of the disc-shaped cutter body. The cutting insert is configured to cut tooth grooves in a relevant element to form teeth. The cutting insert is configured to cut flanks of the teeth and to cut the roots of the teeth. For instance, a portion of the cutting edge extending along each of the major side portions may be configured to cut a portion of a flank of a tooth and a portion of the cutting edge at each of the minor side portions may be configured to cut a root of a tooth.

According to embodiments, the third bottom surface may be flat and the fourth bottom surface may be flat, and the third and fourth bottom surfaces may extend substantially in parallel with each other. In this manner a protrusion in an insert seat of a gear milling cutter may be provided with a flat surface to abut against the third and fourth bottom surfaces, respectively. Such a protrusion with a flat surface for abutting against the third or fourth bottom surface is comparatively easy to manufacture.

According to embodiments, the tooth flank cutting portion and the tooth root cutting portion of each curved cutting edge may be convex, and the tooth flank cutting portion may have at least one radius which is larger than at least one radius of the tooth root cutting portion. In this manner a prerequisite for cutting involute tooth flanks in a workpiece may be provided.

According to embodiments, the insert body may be provided with at least one through hole extending between the first and second recesses across the longitudinal axis. In this manner, the cutting insert may be secured to a tooth milling cutter by a suitable fastening device, such as a fastening screw, extending through the at least one through hole.

According to embodiments, the first rake face side portion may have a first flat portion and the second rake face side portion may have a second flat portion. The first and second flat portions may extend substantially in parallel. In this manner each of the first and second flat portions, one at a time, may abut against a supporting surface in an insert seat of a gear milling cutter.

According to embodiments, the first bottom surface may be flat and the second bottom surface may be flat. The first and second bottom surfaces may extend substantially in parallel with each other. In this manner each of the first and second bottom surfaces may abut, one at a time, against a corresponding flat surface of a protrusion in an insert seat of a gear milling cutter.

According to embodiments, each of the first and second bottom surfaces may be curved in a respective direction across the longitudinal direction. In this manner, concave first and second bottom surfaces may be provided. Such concave bottom surfaces may provide advantages in the form of secure positioning of the cutting insert when abutting against a suitably shaped protrusion in an insert seat of a gear milling cutter.

According to embodiments, each of the first and second bottom surfaces may be concavely curved in its direction across the longitudinal direction.

According to embodiments, each of the first and second bottom surfaces may have a width in a direction perpendicularly to the longitudinal axis forming at least one third, preferably at least half, of an entire width of the insert body in the direction perpendicularly to the longitudinal axis. In this manner, the first and second bottom surfaces may be provided wide enough to ensure a secure positioning on a protrusion of suitable width in an insert seat of a gear milling cutter.

According to embodiments, the first and second bottom surfaces may be provided with at least one ridge and at least one groove extending along the longitudinal direction. In this manner, the at least one ridge and at least one groove may mate with a corresponding groove and ridge in an insert seat of a gear milling cutter to provide a secure positioning of the cutting insert in the gear milling cutter. Several ridges and grooves in the each of the first and second bottom surfaces may provide serrated first and second bottom surfaces, which may ensure a secure positioning of the cutting insert against a correspondingly serrated surface in an insert seat of a gear milling cutter.

It is a further object of the present disclosure to provide a gear milling cutter having at least two cutting inserts, each with four cutting edges, which are precisely positionable in insert seats of the gear milling cutter, irrespective of a relevant shape of the cutting edges.

According to a further aspect of the disclosure, a gear milling cutter includes a disc-shaped cutter body having a central rotation axis, wherein an imaginary plane extends perpendicularly to the rotation axis and through the cutter body, and wherein the cutter body is provided with a number of circumferentially spaced peripherally arranged insert seats on both sides of the disc-shaped cutter body, at least a first insert seat of the insert seats being provided on one side of the imaginary plane and at least a second insert seat of the insert seats being provided on an opposite side of the imaginary plane. The first and second insert seats are provided at acute angles to the imaginary plane in the cutter body. The gear milling cutter includes a first and a second cutting insert according to aspects and/or embodiments disclosed herein, arranged in the first and second insert seats. A major bottom portion of the first insert seat has a first supporting protrusion and a major bottom portion of the second insert seat has a second supporting protrusion. The first supporting protrusion is arranged to abut against the first or second bottom surface of the first cutting insert, and the second supporting protrusion is arranged to abut against the first or second bottom surface of the second cutting insert. A minor bottom portion of the first insert seat includes a third supporting protrusion and a minor bottom portion of second insert seat includes a fourth supporting protrusion. The third supporting protrusion is arranged to abut against the third or fourth bottom surface of the first cutting insert, and the fourth supporting protrusion is arranged to abut against the third or fourth bottom surface of the second cutting insert.

Since the first, second, third, and fourth supporting protrusions abut against respective of the first or second, and the third or fourth bottom surfaces of the first and second cutting inserts, a precise positioning of the first and second cutting inserts in the first and second insert seats is ensured. As a result the object is achieved. See also the description above relating to the cutting insert.

According to embodiments, the first and second cutting inserts have flat first and second bottom surfaces extending substantially in parallel with each other, wherein the first supporting protrusion is flat and the second supporting protrusion is flat. In this manner a secure abutment between the first and second bottom surfaces and the first and second supporting protrusions may be achieved.

According to embodiments, in which each of the first and second bottom surfaces is curved in a respective direction across the longitudinal direction, such as wherein each of the first and second bottom surfaces is concavely curved in its direction across the longitudinal direction, each of the first and second supporting protrusions may comprise two convex portions, each extending in the longitudinal direction of the cutting insert. The convex portions may be convex in a direction across the longitudinal direction of the cutting insert and may be separated in a direction across the longitudinal direction of the cutting insert by a distance portion. The distance portion may be flat, concave, or convex with a larger radius than a radius of the two convex portions. In this manner the two convex portions of each of the first and second supporting protrusions may abut against the concavely curved bottom surface of the respective first and second cutting inserts while the distance portion does not abut against the first or second bottom surface of a relevant cutting insert. Such an abutment along the two convex portions provides a distinct abutment between a relevant cutting insert and the first and second supporting protrusions. Accordingly, a secure positioning of the cutting insert in the insert seat is provided.

According to embodiments in which the gear milling cutter includes cutting inserts, wherein the first and second bottom surfaces are provided with at least one ridge and at least one groove extending along the longitudinal direction, each of the first and second supporting protrusions has at least one groove and at least one ridge extending in the longitudinal direction and being arranged to mate with the at least one ridge and at least one groove of the first and second supporting protrusions of the cutting inserts. In this manner, the ridges and grooves of the first and second bottom surfaces and the first and second supporting protrusions may ensure that the cutting inserts are correctly positioned on the first and second supporting protrusions.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which:

FIGS. 1a-1e illustrate a cutting insert according to a first embodiment,

FIGS. 4a-4e illustrate a gear milling cutter according to a first embodiment.

DETAILED DESCRIPTION

Figure 2A:
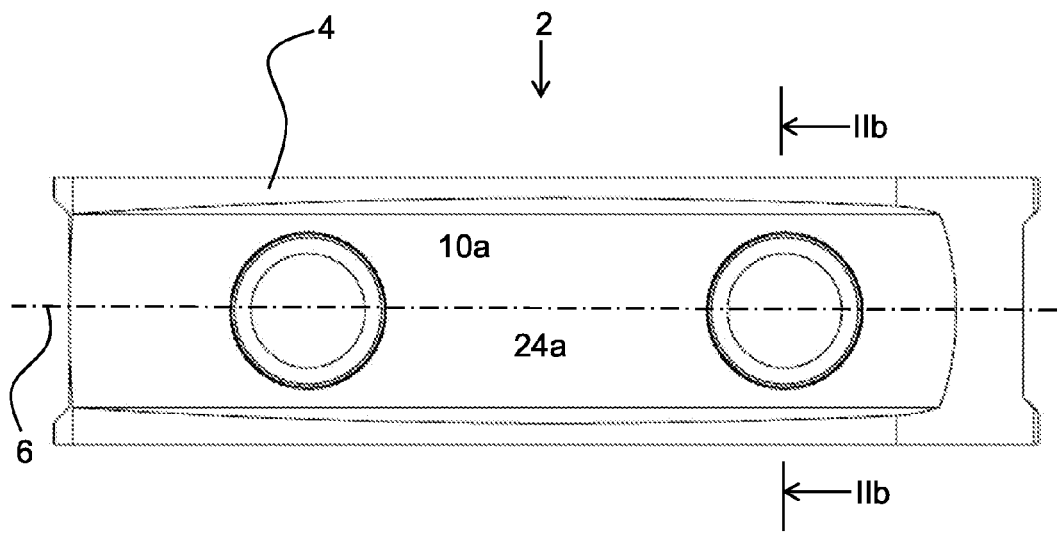
FIGS. 2a and 2b illustrate two views of a cutting insert according to a second embodiment.

Aspects of the present disclosure will now be described more fully. Like numbers refer to like elements throughout. Well-known functions or constructions will not necessarily be described in detail for brevity and/or clarity.

FIGS. 1a-1e illustrate various views of a cutting insert 2 according to a first embodiment. The cutting insert 2 is configured for use in a gear milling cutter and includes an insert body 4 having a longitudinal axis 6 extending along a longitudinal direction of the insert body 4. The insert body 4 is generally shaped to fit inside an imaginary rectangular cuboid 8 as shown in FIG. 1a.

The insert body 4 includes a first major side portion 10a and a second major side portion 10b extending in the longitudinal direction on opposite sides of the insert body 4. The insert body 4 further has a first rake face side portion 12a and a second rake face side portion 12b extending in the longitudinal direction on opposite sides of the insert body 4. The insert body 4 further includes a first minor side portion 14a and a second minor side portion 14b extending across the longitudinal direction and the longitudinal axis 6 on opposite sides of the insert body 4.

The first rake face side portion 12a has a first flat portion 13a and the second rake face side portion 12a has a second flat portion 13b. The first and second flat portions 13a, 13b extend in parallel with each other. In this embodiment each of the first and second rake face side portions 12a, 12b has only a flat portion each. In alternative embodiments, the rake face side portions may include grooves, ridges, and further flat portions.

The cutting insert 2 has four curved cutting edges 16a-16d. Each of the curved cutting edges 16a-16d extends along a rim portion of the insert body 4. One rim portion is formed at an intersection between the first rake face side portion 12a and the first major side portion 10a continuing into the first minor side portion 14a, and one rim portion is formed an intersection between the first rake face side portion 12a and the second major side portion 10b continuing into the second minor side portion 14b. In the same manner the two further rim portions are formed at intersections between the second rake face side portion 12b and the first and second major side portions 10a, 10b continuing into the first and second minor side portions 14a, 14b.

Each curved cutting edge 16a-16d includes a tooth flank cutting portion 18 and a tooth root cutting portion 20. The tooth flank cutting portion 18 and the tooth root cutting portion 20 transition smoothly into each other. The intersections between the rake face side portions 12a, 12b and the major and minor side portions 10a, 10b may also have portions which are not used as cutting edges, such as the straight portion 21 abruptly ending the tooth root cutting portion 20, clearly visible in FIG. 1d.

The tooth flank cutting portion 18 and the tooth root cutting portion 20 of each curved cutting edge 16a-16d is convex. The tooth flank cutting portion 18 has at least one radius which is larger than at least one radius of the tooth root cutting portion 20. Accordingly, each curved cutting edge 16a-16d has at least two radii. Each cutting edge may have a number of radii. The radii of the cutting edges of a particular cutting insert depend inter alia on the angle at which the cutting insert is positioned in a relevant gear milling cutter, the shape of the teeth to be cut by the gear milling cutter, the number of teeth to be cut in a relevant workpiece, and the module of the teeth to be cut.

The first major side portion 10a is provided with a first recess 22a having a first bottom surface 24a and the second major side portion 10b is provided with a second recess 22b having a second bottom surface 24b. The first and second bottom surfaces 24a, 24b extend substantially in parallel with the longitudinal axis 6. In these embodiments, the first bottom surface 24a is flat and the second bottom surface 24b is also flat. The first and second bottom surfaces 24a, 24b extend in parallel with each other.

The first minor side portion 14a is provided with a third recess 26a having a third bottom surface 28a and the second minor side portion 14b is provided with a fourth recess 26b having a fourth bottom surface 28b. The third and fourth bottom surfaces 28a, 28b extend across the longitudinal axis 6. The third bottom surface 28a is flat and the fourth bottom surface 28b is flat, and the third and fourth bottom surfaces 28a, 28b extend in parallel with each other.

The first major side portion 10a and the first minor side portion 14a transition smoothly into each other. Thus, there may not be a clearly visible transition between the first major side portion 10a and the first minor side portion 14a. However, the first bottom surface 24a forms part of the first major side portion 10a and the third bottom surface 28a forms part of the first minor surface 14a. Accordingly, at least in the portions of the first major and minor side surfaces 10a, 14a having the first and third bottom surfaces 24a, 28a, respectively, the first major and minor side portions 10a, 14a are clearly distinguishable. The same goes for the second major and minor side portions 10b, 14b and the second and fourth bottom surfaces 24b, 28b.

The insert body 4 is provided with two through holes 30a, 30b extending between the first and second recesses 22a, 22b across the longitudinal axis 6. See the cross-sectional view shown in FIG. 1c, in which the longitudinal axis 6 extends perpendicularly to the plane of the figure. The cutting insert 2 may be secured to a gear milling cutter by e.g. one screw extending through each of the through holes 30a, 30b.

Each of the first and second bottom surfaces 24a, 24b has a width in a direction perpendicularly to the longitudinal axis 6 forming at least one third, preferably at least half, of an entire width of the insert body 4 in the direction perpendicularly to the longitudinal axis 6. In these embodiments, each of the first and second bottom surfaces 24a, 24b has a width in a direction perpendicularly to the longitudinal axis 6 forming approximately 9/14 of the entire width of the insert body 4 in the direction perpendicularly to the longitudinal axis 6.

Figure 2B:
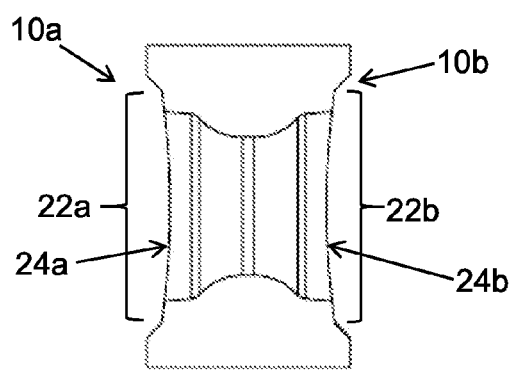

FIGS. 2a and 2b illustrate two views of a cutting insert 2 according to a second embodiment. Again, the cutting insert 2 is configured for use in a gear milling cutter. This embodiment resembles the first embodiment of FIGS. 1a-1e. Accordingly, this description relating to FIGS. 2a and 2b will mainly focus on the differences to the embodiment of FIGS. 1a-1e.

Again, the first major side portion 10a of the insert body 4 is provided with a first recess 22a having a first bottom surface 24a, and the second major side portion 10b is provided with a second recess 22b having a second bottom surface 24b. The first and second bottom surfaces 24a, 24b extend in parallel with the longitudinal axis 6. Each of the first and second bottom surfaces 24a, 24b is curved in a respective direction across the longitudinal direction. Each of the first and second bottom surfaces 24a, 24b is concavely curved in its direction across the longitudinal direction. In the cross-sectional view shown in FIG. 2b the longitudinal axis 6 extends perpendicularly to the plane of the figure.

Figure 3A:
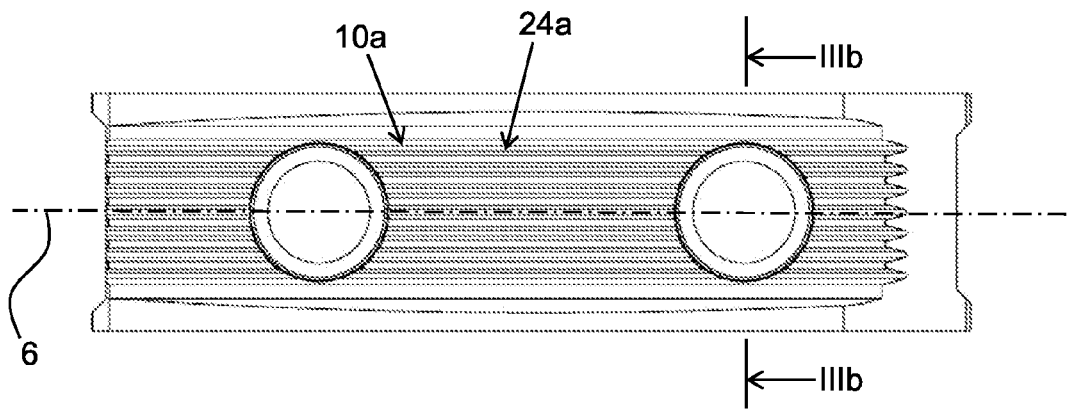
FIGS. 3a and 3b illustrate two views of a cutting insert according to a third embodiment.
Figure 3B:
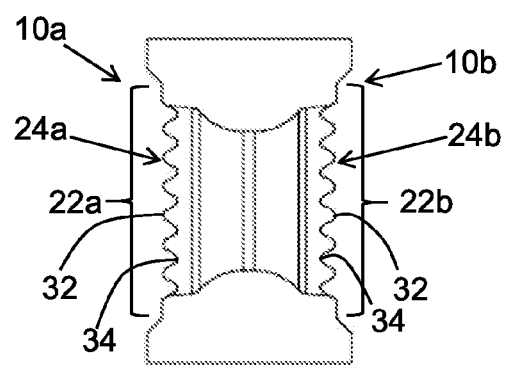

FIGS. 3a and 3b illustrate two views of a cutting insert 2 according to a third embodiment. Again, the cutting insert 2 is configured for use in a gear milling cutter. This embodiment resembles the embodiments of FIGS. 1a-1e, and 2a and 2b. This description relating to FIGS. 3a and 3b will mainly focus on the differences to the previous embodiments.

Again, the first major side portion 10a of the insert body 4 is provided with a first recess 22a having a first bottom surface 24a, and the second major side portion 10b is provided with a second recess 22b having a second bottom surface 24b. The first and second bottom surfaces 24a, 24b extend in parallel with the longitudinal axis 6. The first and second bottom surfaces 24a, 24b are provided with at least one ridge 32 and at least one groove 34 extending along the longitudinal direction 6. In this embodiment each of the first and second bottom surfaces 24a, 24b comprises several ridges 32 and grooves 34. Thus, each of the first and second bottom surfaces 24a, 24b is serrated. In the cross-sectional view shown in FIG. 3b the longitudinal axis 6 extends perpendicularly to the plane of the figure.

Figure 4B:
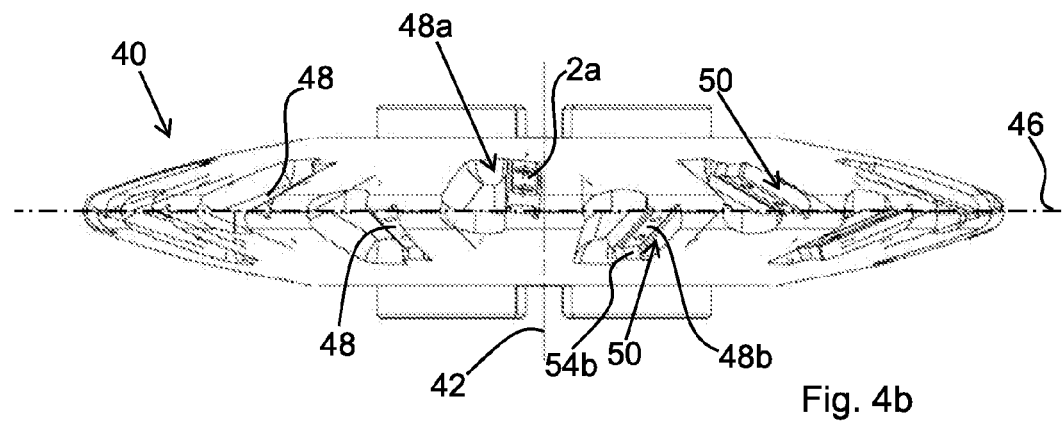
Figure 4A:
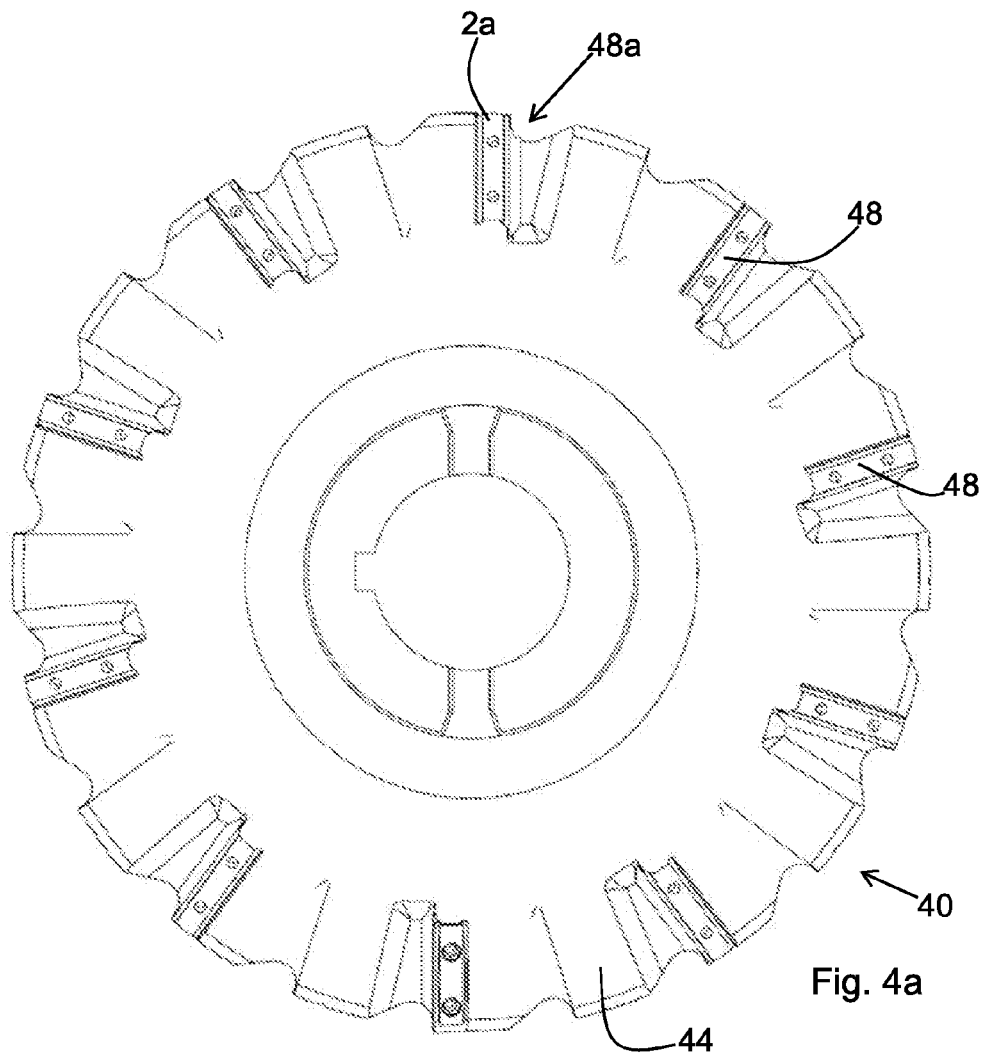

FIGS. 4a and 4b illustrate two views of a gear milling cutter 40 according to a first embodiment. FIGS. 4c-4e illustrate three partial enlarged views of the gear milling cutter 40 illustrated in FIGS. 4a and 4b. The view in FIG. 4a shows the gear milling cutter 40 in a side view, perpendicularly to a rotation axis 42 of the gear milling cutter 40, and FIG. 4b shows a view of the gear milling cutter 40 in parallel with its rotation axis 42.

The gear milling cutter 40 includes a disc-shaped cutter body 44 with the rotation axis 42 centrally arranged. An imaginary plane 46 extends perpendicularly to the rotation axis 42 and through the cutter body 44, in parallel with the plane of the figure in FIG. 4a. The cutter body 44 is provided with a number of circumferentially spaced peripherally arranged insert seats 48 on both sides of the disc-shaped cutter body 44. At least a first insert seat 48a of the insert seats 48 is provided on one side of the imaginary plane 46 and at least a second of the insert seats 48b is provided on an opposite side of the imaginary plane 46. In these embodiments there are provided ten insert seats 48 on each side of the imaginary plane 46. In alternative embodiments, the number of insert seat may be larger or smaller than ten on each side of the imaginary plane 46. The first and second insert seats 48a, 48b are arranged at acute angles to the imaginary plane 46 in the cutter body 44. Tangential insert support surfaces 50 of the insert seats 48 face in a same rotational direction.

The gear milling cutter 40 is arranged to have a first cutting insert 2a and a second cutting insert according to the embodiment of FIGS. 1a-1e arranged in the first and second insert seats 48a, 48b. In FIGS. 4a-4c only the first cutting insert 2a is illustrated. As understood by the skilled person, the second cutting insert is arranged in a corresponding manner in the second insert seat 48b.

A major bottom portion of the first insert seat 48a includes a first supporting protrusion 52a and a major bottom portion of the second insert seat 48b includes a second supporting protrusion 52b. The first supporting protrusion 52a is arranged to abut against the first or second bottom surface 24a, 24b of the first cutting insert 2a, see FIGS. 1a, 1b, and 4c. In a corresponding manner the second supporting protrusion 52b is arranged to abut against the first or second bottom surface of the second cutting insert.

In this embodiment, the first supporting protrusion 48a is flat and the second supporting protrusion 48b flat. Thus, the gear milling cutter is arranged for use with first and second cutting inserts having flat first and second bottom surfaces 24a, 24b, as discussed in connection with FIGS. 1a-1e.

A minor bottom portion of the first insert seat 48a comprises a third supporting protrusion 54a, see FIGS. 4d and 4e. In a corresponding manner a minor bottom portion of the second insert seat 48b has a fourth supporting protrusion 54b, see FIG. 4b. The third supporting protrusion 54a is arranged to abut against the third or fourth bottom surface 28a, 28b of the first cutting insert 2a, see FIGS. 1a, 1b, and 4e. In a corresponding manner the fourth supporting protrusion 54b is arranged to abut against the third or fourth bottom surface of the second cutting insert.

Accordingly, the first, second, third, and fourth supporting protrusions 52a, 52b, 54a, 54b are arranged in supporting abutment with respective of the first, or second, and third, or fourth bottom surfaces 24a, 24b, 28a, 28b of the first and second cutting inserts 2. Furthermore, the first or second rake face side portions 12a, 12b of the first and second cutting inserts 2 abut against the tangential insert support surfaces 50 of the first and second insert seats 48a, 48b. Thus, the first and second cutting inserts 2 are precisely and securely positioned in the first and second insert seats 2 when, e.g. non-shown screws are arranged in the through holes 30a, 30b of the cutting inserts 2 and are tightened in therefore arranged threaded holes 56 in the cutter body 44. The two threaded holes 56 in each insert seat 48 may be slightly offset, e.g. 0.1-0.3 mm, towards the tangential insert support surface 50 and the third or fourth protrusion 54a, 54b to ensure a tight abutment of the cutting insert 2 against the cutter body 44 in the insert seat 48.

Figure 5A:
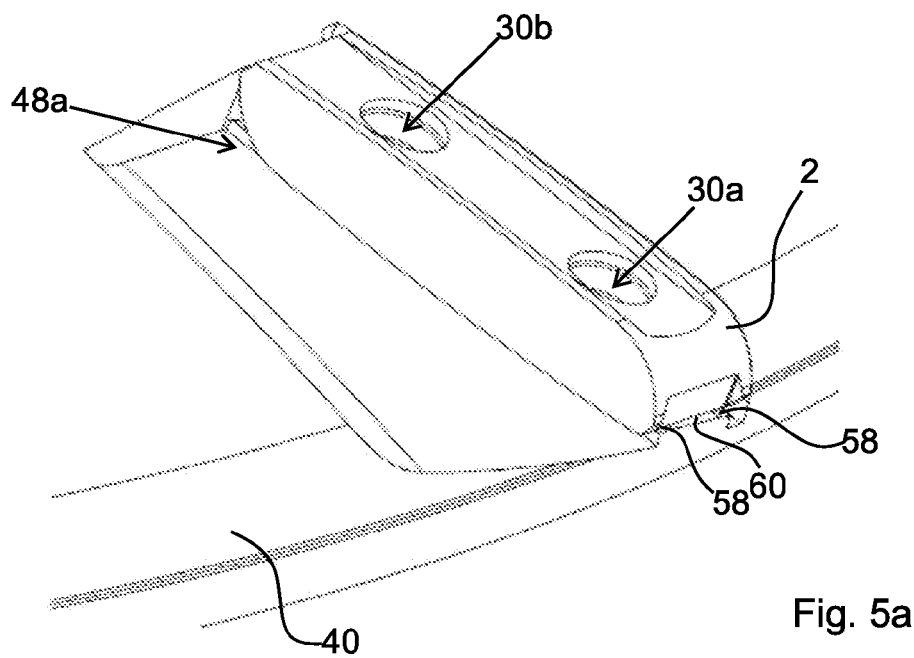
FIGS. 5a and 5b illustrate two partial enlarged views of a gear milling cutter according to a second embodiment.
Figure 5B:
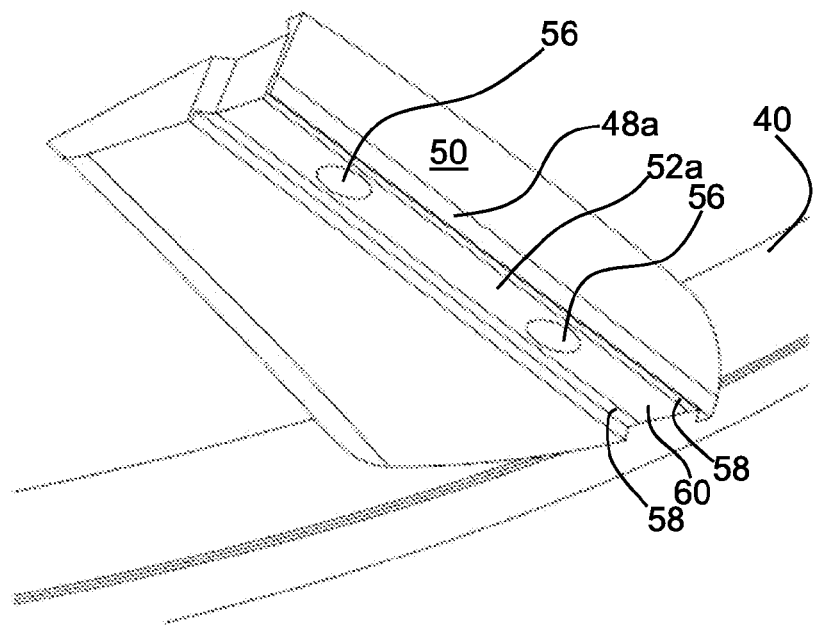

FIGS. 5a and 5b illustrate two partial enlarged views of a gear milling cutter 40 according to a second embodiment. The embodiment resembles the embodiment of FIGS. 4a-4e and differs only with respect to the insert seats 48, more specifically, with respect to the first and second supporting protrusions 52a, 52b of the major bottom portions of the insert seats 48. Therefore, only this feature will be discussed in the following. In FIGS. 5a and 5b, only one insert seat is illustrated, and reference will be made to only the first insert seat 48a and the first supporting protrusion 52a. The same is however, also relevant for the second insert seat and further insert seats of the gear milling cutter, as well as the second supporting protrusion and corresponding supporting protrusions in further insert seats.

The first supporting protrusions 52a includes two convex portions 58 extending in the longitudinal direction of a cutting insert 2 positioned in the first insert seat 48a. The convex portions 58 are convex in a direction across the longitudinal direction of the cutting insert 2 and are separated in a direction across the longitudinal direction of the cutting insert 2 by a distance portion 60. The distance portion 60 in these embodiments is flat, but may alternatively be concave, or convex with a larger radius than a radius of the two convex portions 58. Accordingly, in these embodiments the first supporting protrusion 52a is arranged to abut against the first or second bottom surface of a cutting insert 2 wherein the first and second bottom surfaces are curved in a respective direction across the longitudinal direction, such as e.g. the cutting insert 2 according to the embodiments of FIGS. 2a and 2b.

The two convex portions 58 of the first supporting protrusion 52a abut against the concavely curved first or second bottom surface of the cutting insert 2 while the distance portion 60 does not abut against the first or second bottom surface. When attaching the cutting insert 2 in the insert seat 48 by two screws extending through the through holes 30a, 30b into slightly offset threaded holes 56, the cutting insert 2 may slide with its concave bottom surface 24a, 24b on the convex portions 58 to securely abut with its rake face side portion 12a, 12b against the tangential insert support surface 50 in the insert seat 48.

Mentioned purely as an example, the radius of the convex portions 58 may be approximately 35 mm for a cutting insert 2 having a width of 14 mm across its longitudinal axis 6 and a width of the respective first and second bottom surfaces of 9 mm. The width of each convex portion 58 may be e.g. 1-3 mm.

Figure 6A:
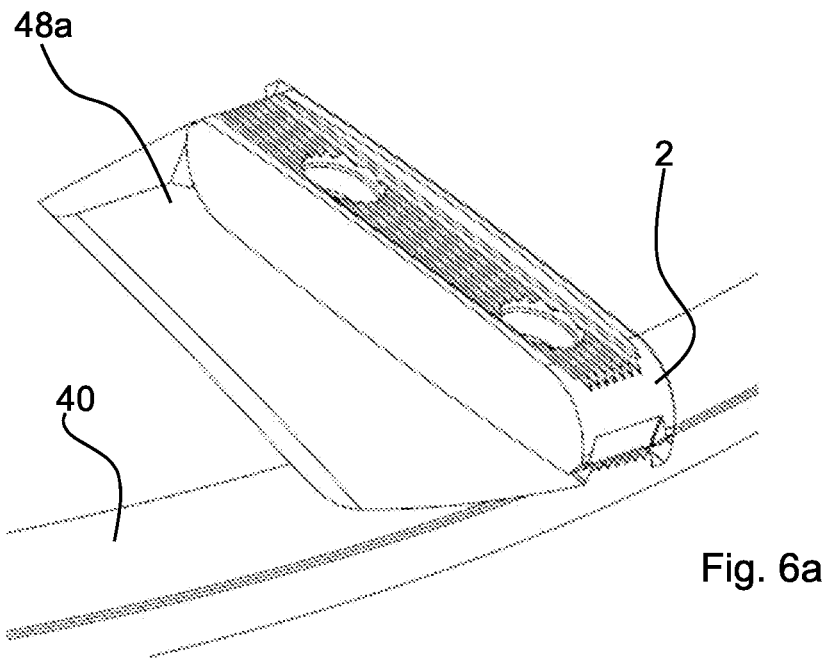
FIGS. 6a and 6b illustrate two partial enlarged views of a gear milling cutter according to a third embodiment.
Figure 6B:
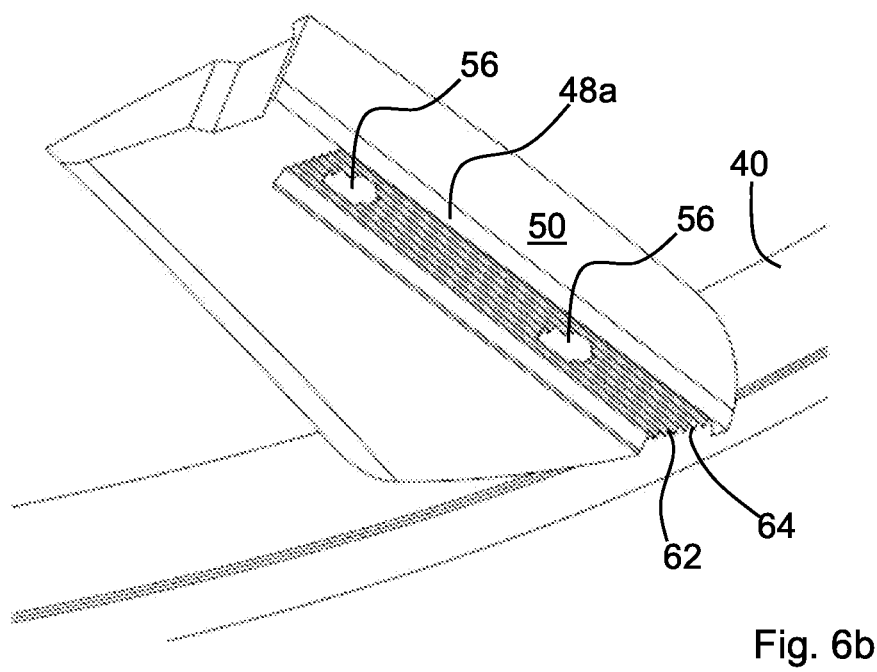

FIGS. 6a and 6b illustrate two partial enlarged views of a gear milling cutter 40 according to a third embodiment. The embodiment resembles the embodiment of FIGS. 4a-4e and differs only in with respect to the insert seats 48, more specifically, with respect to the first and second protrusions 52a, 52b of the major bottom portions of the insert seats 48. Therefore, only this feature will be discussed in the following. In FIGS. 6a and 6b only one insert seat is illustrated, and reference will be made to only the first insert seat 48a and the first supporting protrusion 52a. The same is however, relevant for the second insert seat and further insert seats of the gear milling cutter as well as the second supporting protrusion and corresponding supporting protrusions in further insert seats.

The first supporting protrusions 52a has a number of ridges 62 and grooves 64 extending in the longitudinal direction of a cutting insert 2 positioned in the first insert seat 48a. Accordingly, in these embodiments the first supporting protrusion 52a is arranged to abut against the first or second bottom surface of a cutting insert 2 wherein the first and second bottom surfaces comprise at least one corresponding ridge and groove arranged to mate with the ridges and grooves of the first supporting protrusion 52a, such as e.g. the cutting insert 2 according to the embodiments of FIGS. 3a and 3b. The number of ridges 62 and grooves 64 provide a serrated surface. According to some embodiments, the first and second supporting protrusions 52a, 52 may have at least one groove 64 and at least one ridge 62 extending in the longitudinal direction of a relevant cutting insert 2.

In some embodiments, the interlocking between the serrated surfaces of the first supporting protrusion 52a and of a bottom surface 24a, 24b of a relevant cutting insert 2 may be strong enough to support tangential cutting forces. In such embodiments, the cutting insert 2 may not have to abut against the tangential insert support surface 50 in the insert seat 48.

This disclosure should not be construed as limited to the embodiments set forth herein. A person skilled in the art will realize that different features of the embodiments disclosed herein may be combined to create embodiments other than those described herein, without departing from the scope of the present disclosure, as defined by the appended claims.

Although the disclosure has been described with reference to example embodiments, many different alterations, modifications and the like will become apparent for those skilled in the art. For instance, the third and fourth supporting protrusions 54a, 54b may be provided on a mechanism for adjusting a position of the cutting insert 2 along its longitudinal direction in an insert seat 48. Further cutting inserts of other kinds may additionally be provided in the gear milling cutter 40, e.g. cutting inserts for cutting top portions of teeth. Therefore, it is to be understood that the foregoing is illustrative of various example embodiments and that the disclosure is defined only by the appended claims.

As used herein, the term "comprising" or "comprises" is open-ended, and includes one or more stated features, elements, steps, components or functions but does not preclude the presence or addition of one or more other features, elements, steps, components, functions or groups thereof.

The invention claimed is:

1. A cutting insert for a gear milling cutter, the cutting insert comprising:
   an insert body having a longitudinal axis extending along a longitudinal direction of the insert body, the insert body being generally shaped to fit inside an imaginary rectangular cuboid;
   a first major side portion and a second major side portion extending in the longitudinal direction on opposite sides of the insert body;
   a first rake face side portion and a second rake face side portion extending in the longitudinal direction on opposite sides of the insert body;
   a first minor side portion and a second minor side portion extending across the longitudinal axis on opposite sides of the insert body; and
   four curved cutting edges, each curved cutting edge extending along a rim portion formed at an intersection between the first or second rake face side portion and the first or second major side portion continuing into the first or second minor side portion, wherein each curved cutting edge includes a tooth flank cutting portion and a tooth root cutting portion, wherein the first major side portion is provided with a first recess having a first bottom surface and the second major side portion is provided with a second recess having a second bottom surface, the first and second bottom surfaces extending substantially in parallel with the longitudinal axis, and wherein the first minor side portion is provided with a third recess having a third bottom surface and the second minor side portion is provided with a fourth recess having a fourth bottom surface, the third and fourth bottom surfaces extending across the longitudinal axis.

2. The cutting insert according to claim 1, wherein the third bottom surface is flat and the fourth bottom surface is flat, and wherein the third and fourth bottom surfaces extend substantially in parallel with each other.

3. The cutting insert according to claim 1, wherein the tooth flank cutting portion and the tooth root cutting portion of each curved cutting edge is convex, and wherein the tooth flank cutting portion has at least one radius which is larger than at least one radius of the tooth root cutting portion.

4. The cutting insert according to claim 1, wherein the insert body is provided with at least one through hole extending between the first and second recesses.

5. The cutting insert according to claim 1, wherein the first rake face side portion includes a first flat portion and the second rake face side portion includes a second flat portion, and wherein the first and second flat portions extend substantially in parallel.

6. The cutting insert according to claim 1, wherein the first bottom surface is flat and the second bottom surface is flat, and wherein the first and second bottom surfaces extend substantially in parallel with each other.

7. The cutting insert according to claim 1, wherein each of the first and second bottom surfaces is curved in a respective direction across the longitudinal direction.

8. The cutting insert according to claim 7, wherein each of the first and second bottom surfaces is concavely curved in its direction across the longitudinal direction.

9. The cutting insert according to claim 1, wherein each of the first and second bottom surfaces has a width in a direction perpendicular to the longitudinal axis forming at least one third of an entire width of the insert body in the direction perpendicular to the longitudinal axis.

10. The cutting insert according to claim 1, wherein the first and second bottom surfaces are provided with at least one ridge and at least one groove extending along the longitudinal direction.

11. The cutting insert according to claim 9, wherein the width of the first and second bottom surfaces is at least half the entire width of the insert body in the direction perpendicular to the longitudinal axis.

12. A gear milling cutter comprising:
   a disc-shaped cutter body having a central rotation axis, wherein an imaginary plane extends perpendicularly to the rotation axis and through the cutter body, and wherein the cutter body is provided with a number of circumferentially spaced peripherally arranged insert seats on both sides of the disc-shaped cutter body, at least a first insert seat of the insert seats being provided on one side of the imaginary plane and at least a second insert seat of the insert seats being provided on an opposite side of the imaginary plane, and wherein the first and second insert seats are provided at acute angles to the imaginary plane in the cutter body; and
   a first cutting insert and a second cutting insert arranged in the first and second insert seats, wherein each first and second cutting insert includes an insert body having a longitudinal axis extending along a longitudinal direction of the insert body, the insert body being generally shaped to fit inside an imaginary rectangular cuboid; a first major side portion and a second major side portion extending in the longitudinal direction on opposite sides of the insert body; a first rake face side portion and a second rake face side portion extending in the longitudinal direction on opposite sides of the insert body; a first minor side portion and a second minor side portion extending across the longitudinal axis on opposite sides of the insert body; and four curved cutting edges, each curved cutting edge extending along a rim portion formed at an intersection between the first or second rake face side portion and the first or second major side portion continuing into the first or second minor side portion, wherein each curved cutting edge includes a tooth flank cutting portion and a tooth root cutting portion, wherein the first major side portion is provided with a first recess having a first bottom surface and the second major side portion is provided with a second recess having a second bottom surface, the first and second bottom surfaces extending substantially in parallel with the longitudinal axis, and wherein the first minor side portion is provided with a third recess having a third bottom surface and the second minor side portion is provided with a fourth recess having a fourth bottom surface, the third and fourth bottom surfaces extending across the longitudinal axis; a major bottom portion of the first insert seat includes a first supporting protrusion and a major bottom portion of the second insert seat includes a second supporting protrusion, the first supporting protrusion being arranged to abut against the first or second bottom surface of the first cutting insert and the second supporting protrusion being arranged to abut against the first or second bottom surface of the second cutting insert, wherein a minor bottom portion of the first insert seat includes a third supporting protrusion and a minor bottom portion of second insert seat includes a fourth supporting protrusion, and wherein the third supporting protrusion is arranged to abut against the third or fourth bottom surface of the first cutting insert and the fourth supporting protrusion is arranged to abut against the third or fourth bottom surface of the second cutting insert.

13. The gear milling cutter according to claim 12, wherein the first and second bottom surfaces being flat, the first and second bottom surfaces extending substantially in parallel with each other, wherein the first supporting protrusion is flat and the second supporting protrusion is flat.

14. The gear milling cutter according to claim 12, wherein each of the first and second bottom surfaces being curved in a respective direction across the longitudinal direction, wherein each of the first and second supporting protrusions includes two convex portions, each convex portion extending in the longitudinal direction of the respective first or second cutting insert, the convex portions being convex in a direction across the longitudinal direction of the respective first or second cutting insert and being separated in the direction across the longitudinal direction of the respective first or second cutting insert by a distance portion, the distance portion being flat, concave, or convex with a larger radius than a radius of the two convex portions.

15. The gear milling cutter according to claim 12, wherein the first and second bottom surfaces being provided with at least one ridge and at least one groove extending along the longitudinal direction, wherein each of the first and second supporting protrusions includes at least one groove and at least one ridge extending in the longitudinal direction of the respective first or second cutting insert and being arranged to mate with the at least one ridge and at least one groove of the first and second bottom surfaces.

* * * * *